US008041693B2

(12) United States Patent
Miyata (10) Patent No.: US 8,041,693 B2
(45) Date of Patent: Oct. 18, 2011

(54) STORING IMAGE DATA IN AND RETRIEVING IMAGE DATA FROM MEMORY IN PRINT CONTROLLING SYSTEM

(75) Inventor: Yuji Miyata, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 348 days.

(21) Appl. No.: 11/844,753

(22) Filed: Aug. 24, 2007

(65) Prior Publication Data

US 2008/0052301 A1    Feb. 28, 2008

(30) Foreign Application Priority Data

Aug. 25, 2006    (JP) ................................. 2006-229173

(51) Int. Cl.
*G06F 7/00*    (2006.01)
*G06F 17/30*    (2006.01)
*G06F 15/00*    (2006.01)

(52) U.S. Cl. ........................................ 707/705; 358/1.6
(58) Field of Classification Search ........................ None
See application file for complete search history.

(56) References Cited

U.S. PATENT DOCUMENTS

| 6,590,675 | B1 | 7/2003 | Tomiyasu |
| 7,493,491 | B2 | 2/2009 | Ootsuka et al. |
| 2002/0032714 | A1 | 3/2002 | Monobe |
| 2004/0117411 | A1* | 6/2004 | Ueda et al. ................. 707/200 |
| 2004/0139326 | A1 | 7/2004 | Ootsuka et al. |
| 2005/0198166 | A1 | 9/2005 | Kawaji |
| 2005/0234896 | A1* | 10/2005 | Shima et al. ................. 707/3 |
| 2005/0254099 | A1* | 11/2005 | Yoda et al. ................. 358/403 |
| 2005/0275861 | A1 | 12/2005 | Ferlitsch |
| 2008/0247301 | A1* | 10/2008 | Ueda ................. 369/272.1 |

FOREIGN PATENT DOCUMENTS

| JP | 11298717 | 10/1999 |
| JP | 2000259380 | 9/2000 |
| JP | 2001-051877 A | 2/2001 |
| JP | 2002-082964 A | 3/2002 |
| JP | 2004-171304 A | 6/2004 |
| JP | 2004-213128 A | 7/2004 |
| JP | 2004-362386 A | 12/2004 |
| JP | 2005109681 | 4/2005 |
| JP | 2005-166039 A | 6/2005 |
| JP | 2005353074 | 12/2005 |

OTHER PUBLICATIONS

JP Office Action dtd Mar. 29, 2011, JP Appln. 2006-229173, English Translation.
JP Office Action dtd Jun. 21, 2011, JP Appln. 2006-229173, English Translation.

* cited by examiner

*Primary Examiner* — Uyen T. Le
(74) *Attorney, Agent, or Firm* — Banner & Witcoff, Ltd.

(57) ABSTRACT

A method to control a computer is provided. The computer executes steps of designating the image data file, generating locator information to indicate a location of a corresponding storage folder based on a unique identification of the image data file, and creating the corresponding storage folder having the locator information, which indicates a location of the storage folder, as a folder name. Also, the computer may execute steps including making a copy of the designated image data file having the unique identification and the file name, storing the copied image data file in the corresponding storage folder created in the creating step, and deleting the copied image data file and the corresponding storage folder created in the creating step when the designation of the image data file is invalidated.

11 Claims, 9 Drawing Sheets

FIG.9B to be at smallest...

STORING IMAGE DATA IN AND RETRIEVING IMAGE DATA FROM MEMORY IN PRINT CONTROLLING SYSTEM

CROSS REFERENCE TO RELATED APPLICATION

This application claims priority from Japanese Patent Application No. 2006-229173, filed on Aug. 25, 2006, the entire subject matter of which is incorporated herein by reference.

BACKGROUND

1. Technical Field

An aspect of the present invention relates to a print controlling system for a printing apparatus, which is capable of storing image data in a storage area and reading the image data therefrom to control the printing apparatus. Another aspect of the present invention relates to a computer usable medium to store a controlling program for the print controlling system.

2. Related Art

Conventionally, a controlling system for a printing apparatus which is capable of generating image data representing an image including a predetermined image such as a watermark superposed over arbitrary image and transmitting the image data to a printing apparatus has been used. Such an image includes, for example, a confidential document having a watermark to represent a character string such as "FOR INTERNAL USE ONLY" superposed thereon.

In the controlling system as described above, bitmap data representing the watermark is temporarily stored in a predetermined watermark data storage area (i.e., so-called image buffer.) The bitmap data is then processed in a superposing process unit to be superposed over another bitmap data representing the arbitrary image, and the processed data representing the arbitrary image with the watermark superposed thereon is transmitted to the printing apparatus. An example of such a controlling system is disclosed in Japanese Patent Provisional Publication No. H11-298717.

In the controlling system disclosed in the above referenced publication, the temporarily stored bitmap data is read out according to a location (a path name and a file name) of the bitmap data being designated. Therefore, when a number of characters included in the path name and the file name is large, a number of characters to be written in a database of a printer driver and an operating system becomes large accordingly, which may occupy the storage area of the controlling system.

In an operating system Windows®, for example, 260 characters can be included at maximum in a file name and a path name in total, therefore, a storage area for 260 byte needs to be reserved for the file name and path name designation in driver configuration. Because a volume for the driver configuration to be written in a registry of the operating system has a recommended size, it is desired to maintain the storage area for the file and the path names designation to be at smallest.

SUMMARY

In view of the above, the present invention is advantageous in that a print controlling system for a printing apparatus, which is capable of storing image data in a storage area and reading the image data therefrom, is provided. The print controlling system can be configured to have a smaller volume of data (i.e., characters in a smaller number) to designate the location of the image data.

According to an aspect of the invention, a controlling system for a printing apparatus is provided. The controlling system includes a storage system, which stores a piece of image data, representing an image, on one-to-one basis in a storage folder having a unique identification, a locator information generating system, which generates locator information to indicate a location of the storage folder when the piece of image data is designated to be called by the unique identification, the locator information including the unique identification so that the storage folder can be identified by the locator information, a data retrieving system, which retrieves the piece of image data to be called from the storage folder based on the locator information.

With the controlling system configured as above, the storage folder can be specified by the unique identification of the image file, which is shorter than a sum of the file name and the path name. Therefore, a data volume in a database in an operating system such as the Windows registry can be effectively downsized.

According to another aspect of the invention, a method to control a computer, which is capable of storing an image data file having a file name and representing an image is provided. In the method, the computer executes steps of designating the image data file to be replaced with a previously designated image data file, generating a locator information to indicate a location of a storage folder, in which the designated image data file is stored, based on a unique identification of the image data file, creating the storage folder having the locator information, which indicates a location of the storage folder, as a folder name, making a copy of the designated image data file having the unique identification and the file name identical to the identification and the file name of the designated image data file, storing the copied image data file on one-to-one basis in the storage folder created in the creating step, and deleting the copied image data file and the storage folder created in the creating step when the designation of the image data file is invalidated.

According to still another aspect of the invention, a computer usable medium is provided. The computer usable medium includes computer readable instructions for controlling a computer, which is capable of storing an image data file having a file name and representing an image by executing steps of designating the image data file to be replaced with a previously designated image data file, generating a locator information to indicate a location of a storage folder, in which the designated image data file is stored, based on a unique identification of the image data file, creating the storage folder having the locator information, which indicates a location of the storage folder, as a folder name, making a copy of the designated image data file having the unique identification and the file name identical to the identification and the file name of the designated image data file, storing the copied image data file on one-to-one basis in the storage folder created in the creating step, and deleting the copied image data file and the storage folder created in the creating step when the designation of the image data file is invalidated.

According to still another aspect of the invention, a method to control a computer is provided. The computer is capable of storing an image data file having a file name and representing an image by executing steps of designating the image data file to be replaced with a previously designated image data file, retrieving an image data file identical to the designated image data file from a storage folder created to have locator information as a folder name, the locator information indicating a location of the storage folder and being generated based on a unique identification of the image data file.

According to still another aspect of the invention, a computer usable medium is provided. The computer usable medium includes computer readable instructions for controlling a computer, which is capable of storing an image data file having a file name and representing an image by executing steps of designating the image data file to be replaced with a previously designated image data file, retrieving an image data file identical to the designated image data file from a storage folder created to have locator information as a folder name, the locator information indicating a location of the storage folder and being generated based on a unique identification of the image data file.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Figure 1:
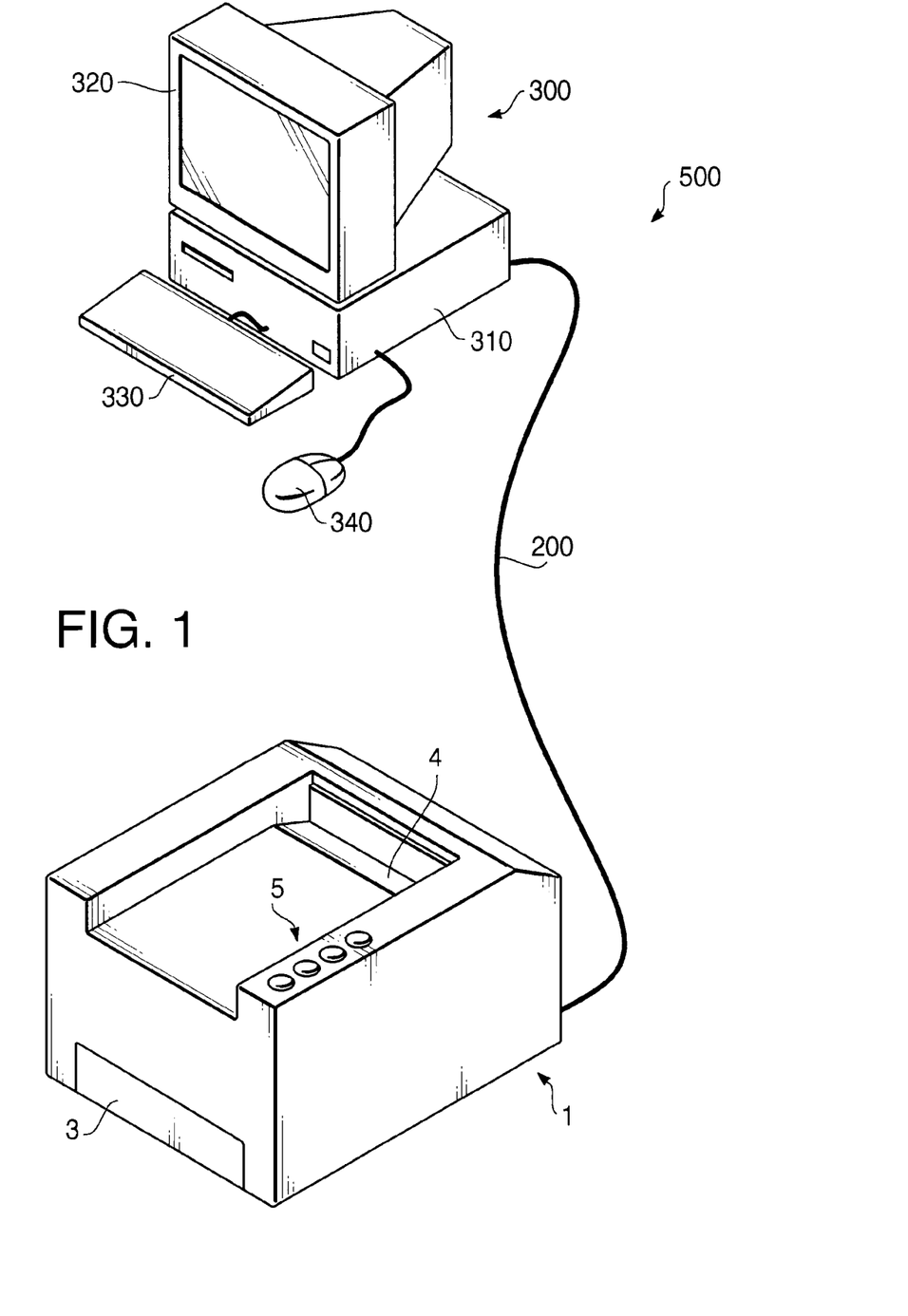
FIG. 1 is an external view schematically showing a configuration of a printing system in accordance with an embodiment of the present invention.

Hereinafter, embodiments according to aspects of the present invention will be described with reference to the accompanying drawings. FIG. 1 is an external view schematically showing a configuration of a printing system 500 in a first embodiment according to aspects of the present invention. As shown in FIG. 1, the printing system 500 of the first embodiment is configured with a color laser printer (hereinafter, simply referred to as a printer) 1 as an example of an image forming device, and a personal computer (hereinafter, simply referred to as a PC) 300 as an example of a controlling system for the printer connected with the printer 1 via a cable 200. It is noted that the printer 1 may be connected with the PC 300 via a network such as LAN or infrared data communication.

The printer 1 is provided with a widely known printer engine 2 (see FIG. 2) as an example of an image forming means configured to form an image with toners of yellow, magenta, cyan, and black using an electrophotographic technology. The printer engine 2 forms images onto a paper (not shown) as an example of a recording medium put in a tray 3, and then the paper with the images formed thereon is ejected to a stacker 4. In addition, the printer 1 includes thereon an operation panel 5 through which various settings and instructions can be given.

Figure 2:
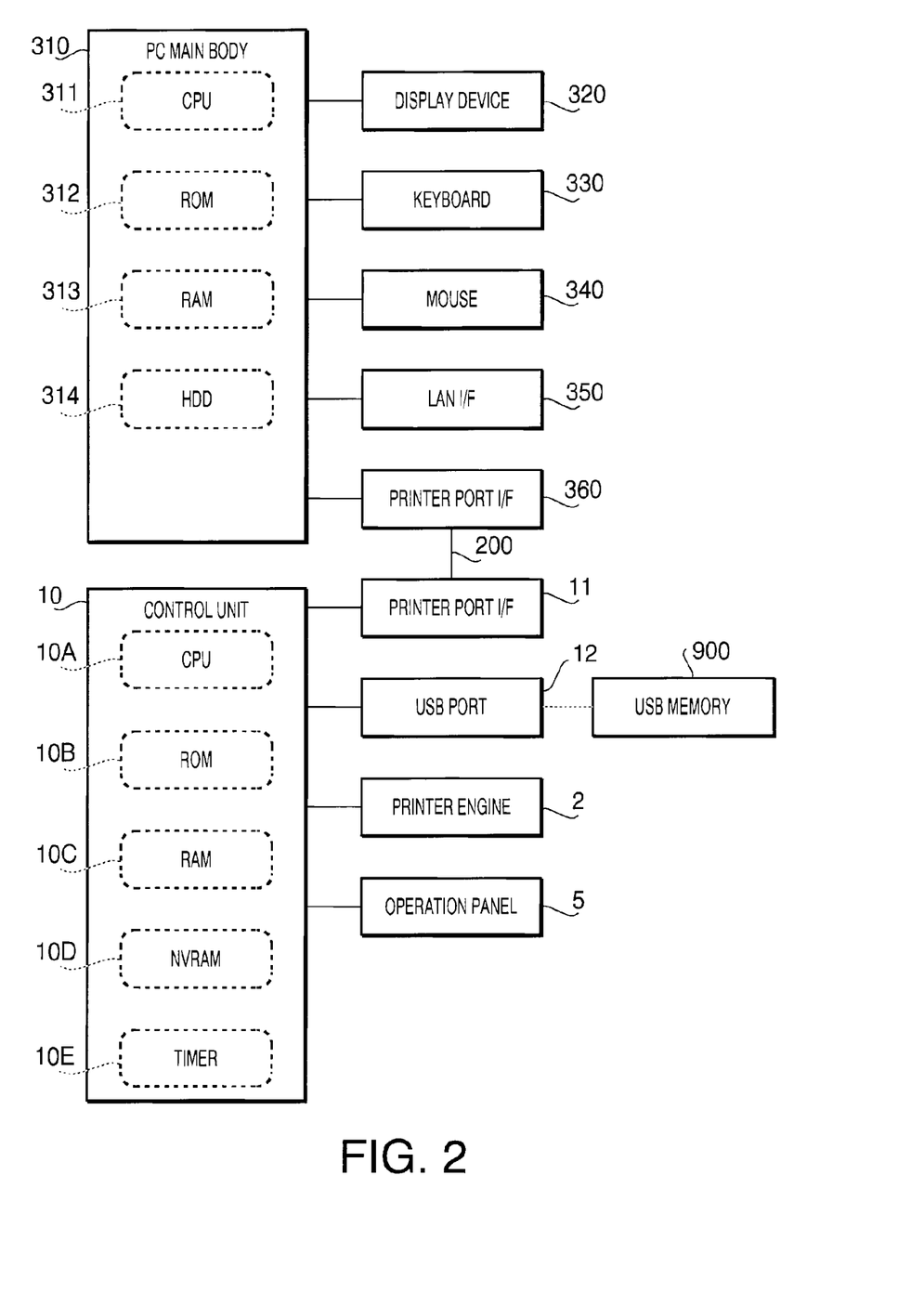
FIG. 2 is a block diagram schematically showing a configuration of the printing system in accordance with the embodiment of the present invention.

FIG. 2 is a block diagram schematically showing a configuration of the printing system 500. As shown in FIG. 2, a main body 310 of the PC 300 includes a CPU 311, ROM 312, RAM 313, and hard disk drive (HDD) 314. The main body 310 of the PC 300 is connected with a display device 320 such as a CRT, keyboard 330, mouse 340 (see FIG. 1). Further, the main body 310 of the PC 300 is provided with a LAN I/F (interface) 350, to which a network cable (not shown) connectable with a LAN (local area network) is connected, and a printer port I/F 360, to which a cable 200 connectable with the printer 1 is connected.

The printer 1 includes a control unit 10 configured to control the aforementioned printer engine 2. The control unit 10 is configured as a microcomputer provided with a CPU 10A, ROM 10B, and RAM 10C. In addition, the control unit 10 is provided with an NVRAM 10D configured such that data stored therein are not deleted even though being powered OFF. Moreover, the control unit 10 is connected with a printer port I/F 11 to be connected with the PC 300 via the cable 200, and a LAN I/F 12 to which the LAN cable can be attached, as well as the aforementioned printer engine 2 and operation panel 5. The printer 1 and the PC 300 may be connected to each other through a network such as the LAN via the LAN I/Fs 12, 350.

Figure 3:
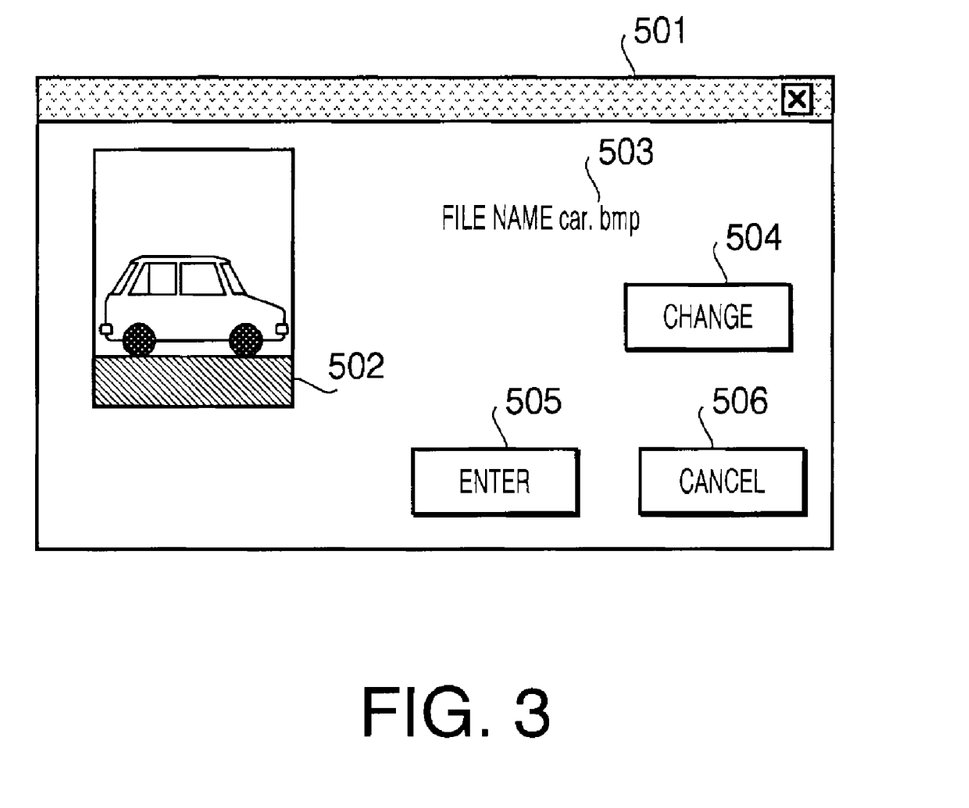
FIG. 3 is an illustrative view of a user interface window displayed on a PC (personal computer) of the printing system in accordance with the embodiment of the present invention.

Next, a process for setting an image file to be executed in the printing system 500 will be described. In this process of the present embodiment, an image is set. When an operation to start setting the image is made by a user, a user interface window 501 is displayed in the display 320. FIG. 3 is an illustrative view of the user interface window 501 displayed in accordance with the embodiment of the present invention. The user interface window 501 includes a representing image 502, a file name 503, a change button 504, an enter button 505, and a cancel button 506. However, the representing image 502 and the file name 503 are not indicated in the user interface window 501 initially when the user interface window 501 is displayed and will be displayed in accordance with the processes described below.

Figure 4:
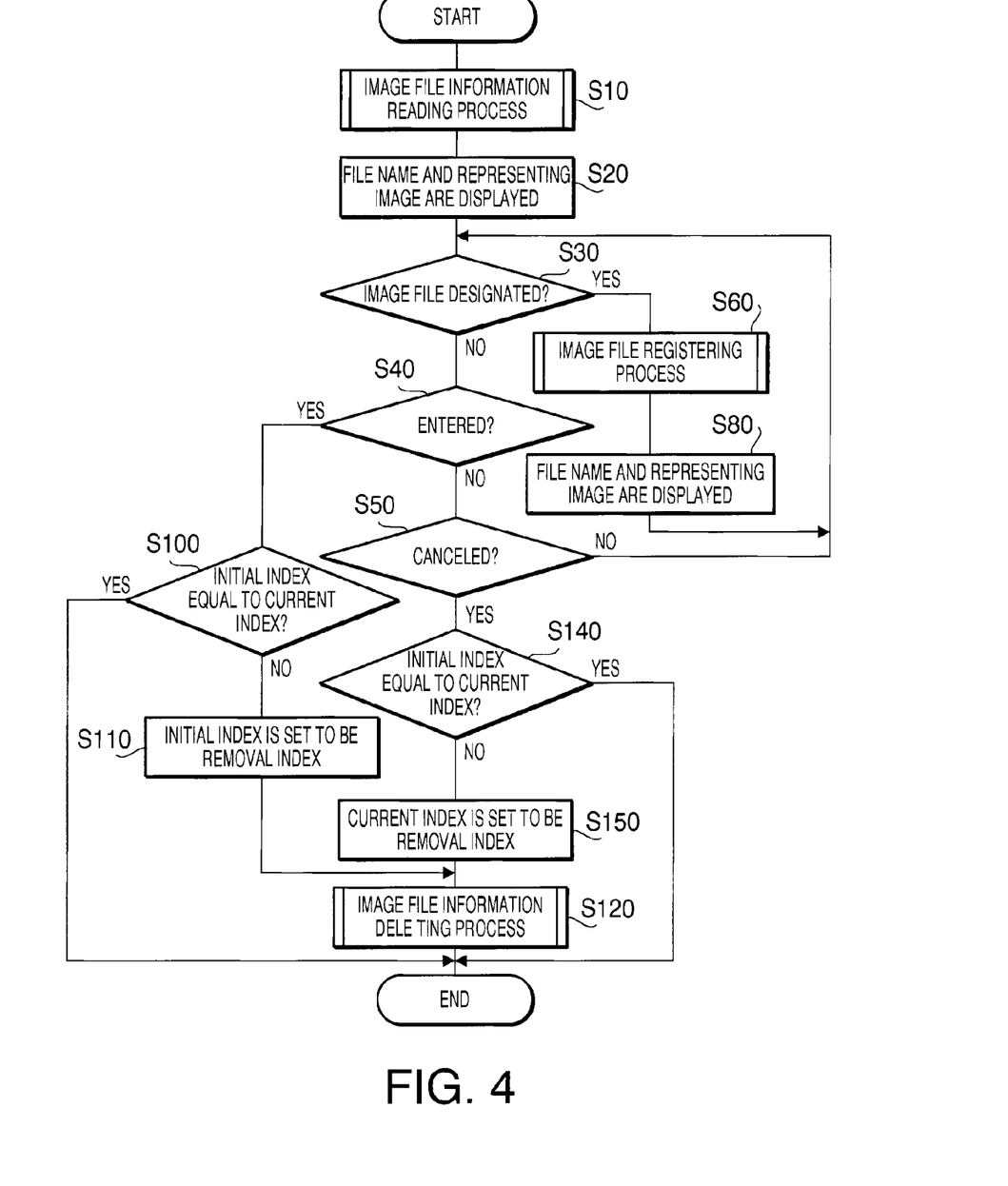
FIG. 4 is a flowchart showing a main routine of a process executed by the PC in accordance with the embodiment of the present invention.

FIG. 4 is a flowchart showing a main routine of the setting process executed by the PC 300 in accordance with the embodiment of the present invention. When the setting process starts as the user interface window 501 is displayed. In S10, an image file information reading process will be executed.

Figure 5:
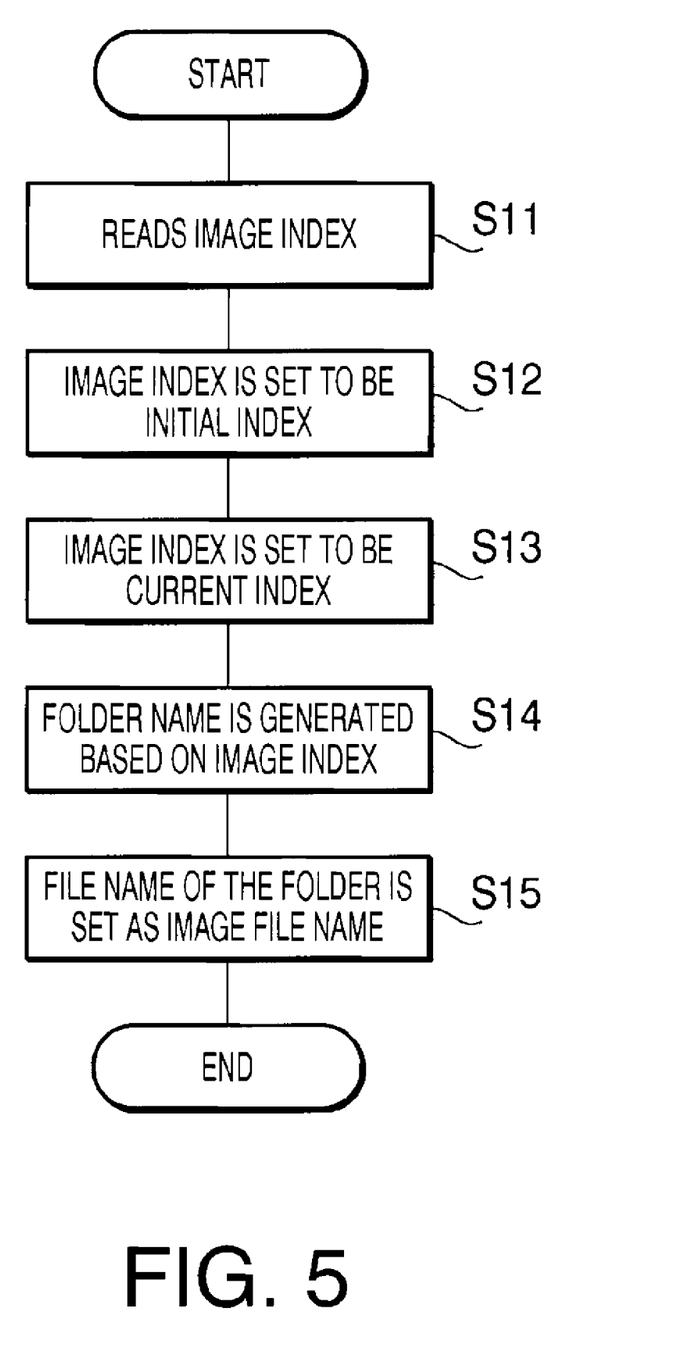
FIG. 5 is a flowchart showing a detailed procedure of an image file information reading process in accordance with the embodiment of the present invention.
Figure 8A:
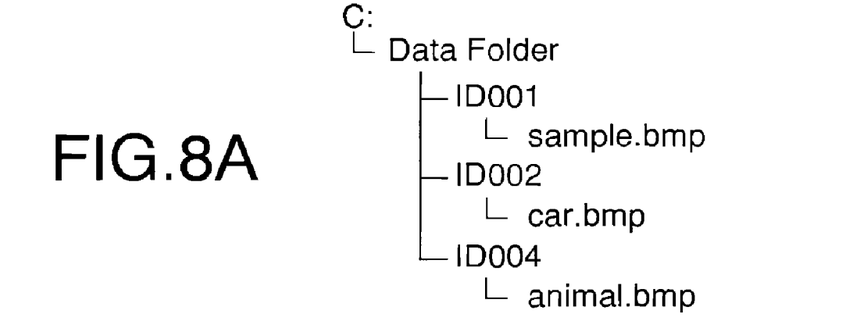
FIGS. 8A-8C illustrate structures of a database folder in a printer driver in accordance with the embodiment of the present invention.

FIG. 5 is a flowchart showing a detailed procedure of the image file information reading process in accordance with the embodiment of the present invention. In this process, in S11, an index to indicate an image (an image index) previously registered for the application use in accordance with a registering process (i.e., an image file information registering process, which will be described later in detail) is read from a database folder of printer driver 730 (see FIG. 9), which is stored in the HDD 314. In the present embodiment, the database folder is configured to have a tree structure as shown in FIG. 8A. FIG. 8A is an illustration of the structure of the database folder in the printer driver in accordance with the embodiment of the present invention. An image in an image file (created in S66 in FIG. 6, which will be described later) named "car.bmp" is previously created (copied) and registered for the application use (in S67 in S67, which will be described later), and a number "002" as an identification of the image file is written in a registry of the printer driver 730. Therefore, in S11, the number "002" is retrieved as the image index.

Next, in S12, the image index retrieved in S11 is set as an initial index. In S13, the image index retrieved in S11 is set as a current index. In S14, the image index retrieved in S11 is converted into a folder name. In the present embodiment, with the image index "002", the folder name "C:\Data Folder\ID002" is obtained. More specifically, predetermined locator information, which includes an upper address (i.e., a path name) of the image file ("C:\Data Folder\ID002") and a predetermined alphanumeric characters ("ID"), is appended to the three digit number indicating the image index. Thus, the folder name "C:\Data Folder\ID002" is generated. Next, in S15, a file name ("car.bmp") of the image file stored in the folder having the folder name generated in S14 (C:\Data Folder\ID002") is set to be the file name 503 to be displayed in the user interface window 501. The process proceeds to S20 (FIG. 4.) It will be noted as described below, in the present embodiment, a folder having the folder name generated in S14 corresponds to the image file stored therein on one-to-one basis, and the name of the image file corresponds to a file name that can be made by the user. Therefore, the user can recognize the image in the image file by the file name.

In S20 in FIG. 4, the file name 503 ("car.bmp") obtained in S5 and the representing image 502 which is retrieved from the HDD 314 according to the file name 503 are displayed in the user interface window 501, as shown in FIG. 3.

Next, in S30, it is judged as to whether another image file is designated. More specifically, when the change button 504 in the user interface window 501 is pressed by the user who then specifies another image file by, for example, referring to a file database and designating an image file, it is determined that the designation is made. If the image file is not designated (S30: NO), in S40, it is judged as to whether the enter button 505 is pressed. If the enter button 505 is not pressed (S40: NO), in S50, it is determined as to whether the cancel button 506 is pressed. If the cancel button 506 is not pressed (S50: NO), the process returns to S30. Thus, the process repeats S30-S50 until the image file is designated (S30: YES.)

Figure 6:
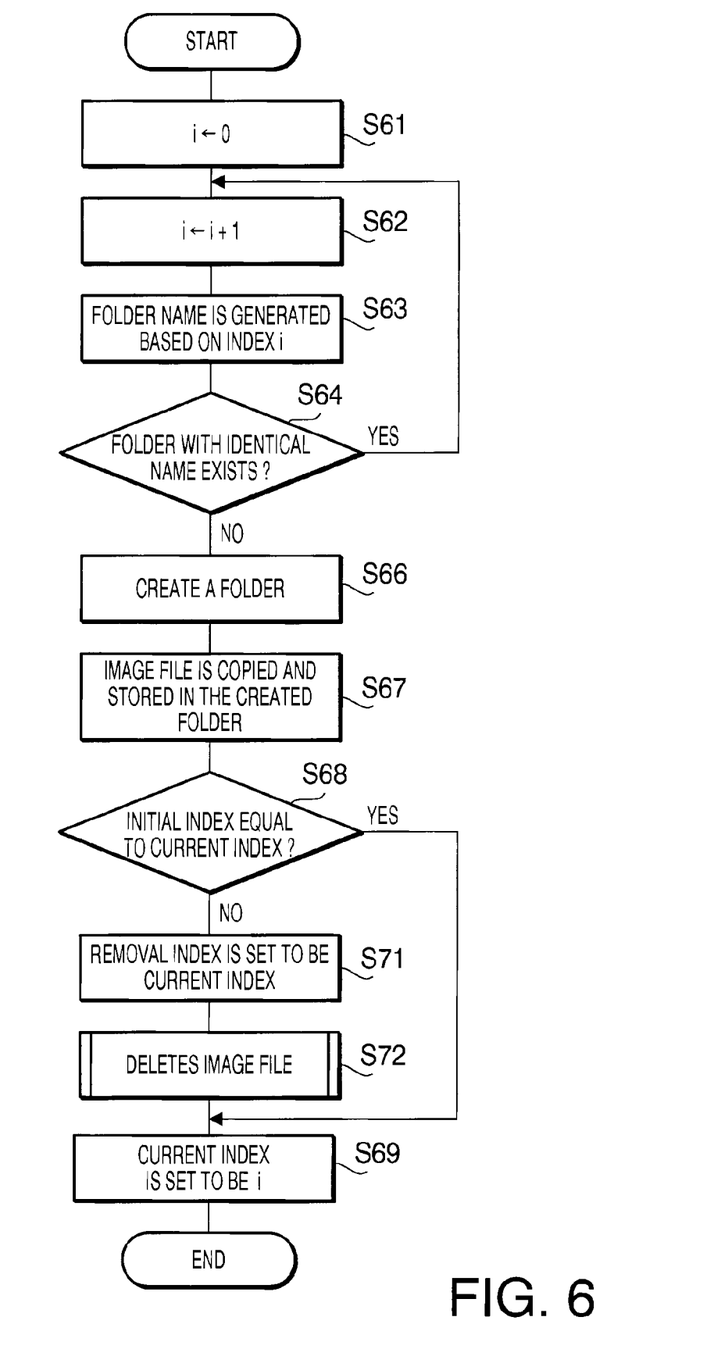
FIG. 6 is a flowchart showing a detailed procedure of an image file information registering process in accordance with the embodiment of the present invention.

In S30, When the image file is designated (S30: YES), the process proceeds to S60, wherein the image file information registering process is executed. In the present embodiment, an image file having a file name "airplane.bmp" is designated as an example. FIG. 6 is a flowchart showing a detailed procedure of the image file information registering process in accordance with the embodiment of the present invention. In S61, a number i as an index (registering index) for the designated image to replace the previous image indicated in the user interface window 501 is set to be "0." Next, in S62, (i+1) is set to be a new registering index i (i=001.) Next, in S63 the new registering index "001" is converted to a folder name ("C:\Data Folder\ID001") similarly to S14. Next, in S64, it is judged as to whether a folder having the identical folder name is present.

If a file having the identical folder name is present (S64: YES), the process returns to S62, and the registering index is incremented by one. Thereafter, when a folder having the identical folder name is not present (S64: NO), in S66, a new folder is created, and the folder name generated in S63 is given to the new folder. Next, in S67, the image file designated in S30 is copied and stored in the folder created in S66.

In the present embodiment, for example, as shown in FIG. 8A, indexes 001 and 002 are already present in the database folder, therefore, in S64, it is judged to be YES. When S62 and S63 are repeated, and the index is incremented to be 003, it is judged to be NO in S64, and a folder having a folder name "C:\Data Folder\ID003" is created in S66.

Figure 8B:
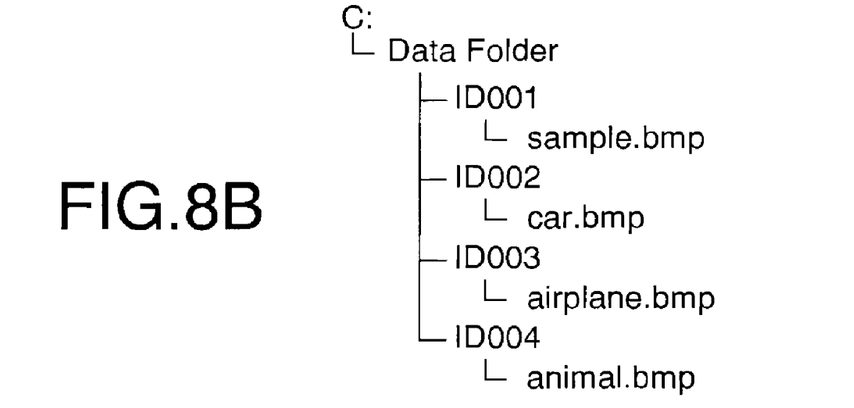

FIG. 8B is an illustration of a structure of the database folder in a printer driver in accordance with the embodiment of the present invention. In S67, the image file designated in S30 ("airplane.bmp") is copied and stored in the folder having the folder name "C:\Data Folder\ID003" as shown in FIG. 8B. It is noted in the present embodiment the image file designated in S30 is not moved but copied to be stored in the newly created folder. Therefore, the image file "airplane.bmp" remains in the original location so that the image file can still be used in another application.

Next, in S68, it is judged as to whether the initial index set in S12 is equal to the current index set in S13. In the present embodiment, when S60 is executed for a first time after the user interface window 501 was displayed, the initial index (see S11) and the current index (see S12) are equal (S68: YES.) Next, in S69, the registering index i ("003") is set to be a current index. Thereafter, the process proceeds to S80 (FIG. 4.)

In S80, the file name 503 ("airplane.bmp") and the representing image 502 of the image file designated in S30 but stored in the folder created in S66 are displayed in the user interface window 501. The process thereafter returns to S30.

As S30 is repeated, if a new image file is designated (S30: YES), the process proceeds to S60, and in S68, it is judged to be NO (S68: NO), because the current index ("003") is not equal to the initial index ("002") (see S69.) Accordingly, the process proceeds to S71.

In S71, the current index ("003") is set to be an index to be removed (removal index). Next, in S72, the image file stored in the folder created in S66 is removed. The process thereafter proceeds to S69.

Figure 8C:
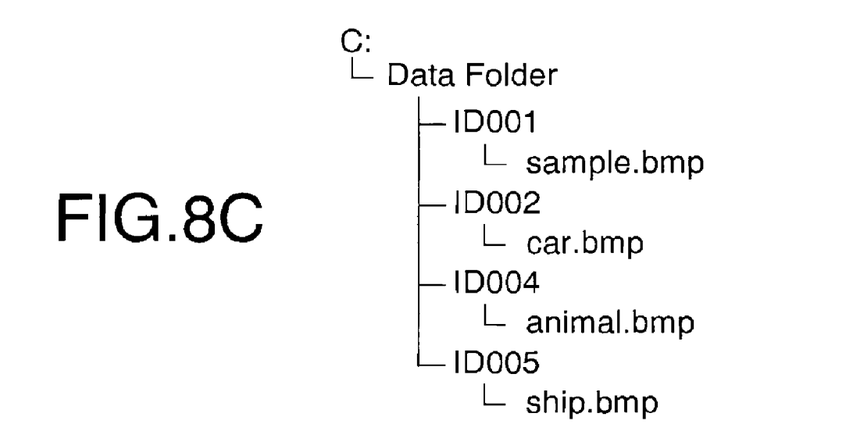

In the present embodiment, after the image file "airplane.bmp" is specified in S30, if neither of the enter button 505 and the cancel button 506 is pressed (S40: N0, S50: NO), S30 is repeated. Again in S30, if a new image file "ship.bmp" in the file database is designated (S30: YES), the process proceeds to S60. Accordingly, through S61-S66 a new folder having a file name "C:\Data Folder\ID005", which corresponds to a registering index i 005, is created as shown in FIG. 8C. FIG. 8C is an illustration of the structure of the database folder in the printer driver in accordance with the embodiment of the present invention. In S67, the image file "ship.bmp" is copied and stored in the folder created in S66. Thereafter, in S72, the image file "airplane.bmp" included in the folder having the folder name "C:\Data Folder\ID003" and the folder itself are deleted.

Figure 7:
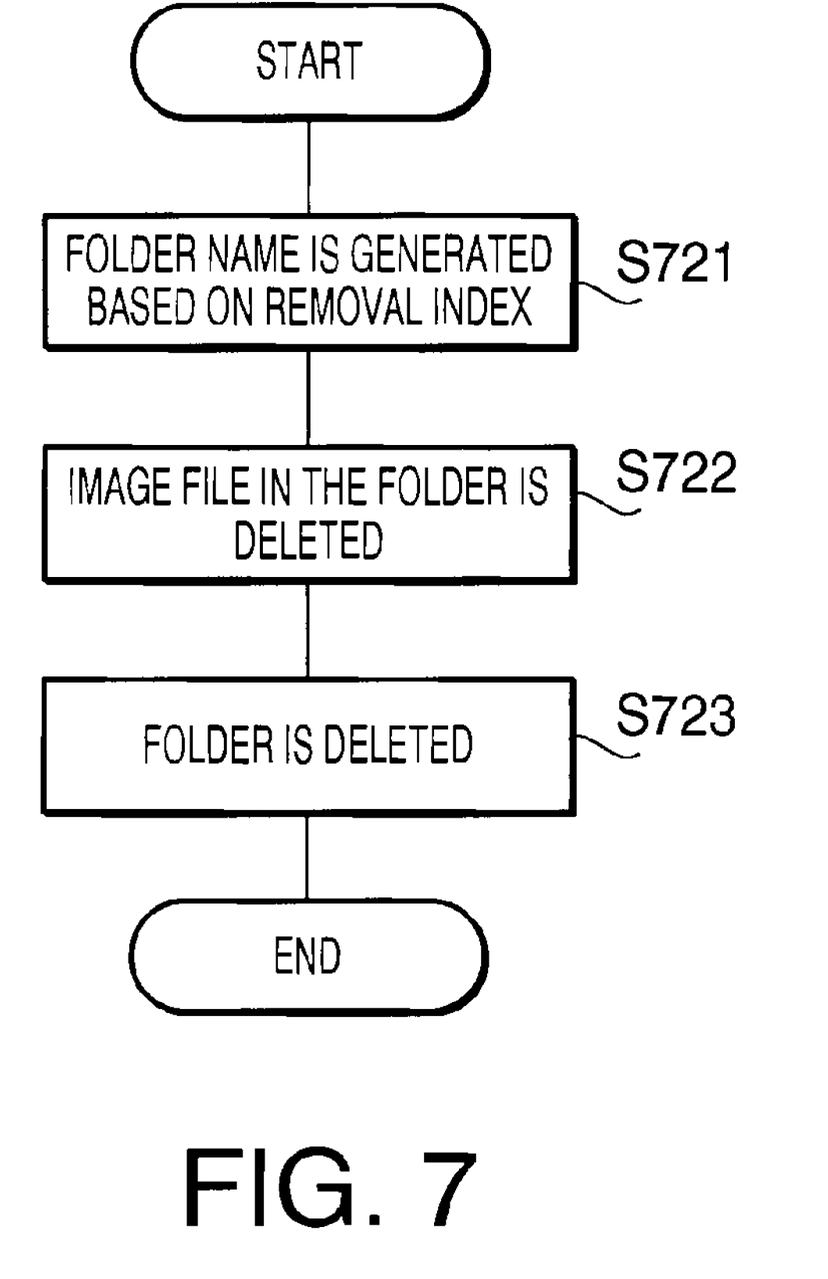
FIG. 7 is a flowchart showing a detailed procedure of an image file information deleting process in accordance with the embodiment of the present invention.

FIG. 7 is a flowchart showing a detailed procedure of an image file information deleting process in accordance with the embodiment of the present invention. In S721, the index number as the removal index ("003") is converted into a folder name ("C:\Data Folder\ID003") for a folder having the image file to be removed. Next, in S722, the image file ("airplane.bmp") stored in the folder which is indicated by the folder name generated in S721 is deleted. Thereafter, in S723, the folder itself indicated by the folder name generated in S721 is deleted. The process proceeds to S69.

Meanwhile, in S40, when the enter button 505 is pressed (S40: YES), the process proceeds to S100, and it is judged as to whether the initial index is equal to the current index. If the two indexes are equal (S100: YES), it is determined that the image file has not been changed (see S12, S13, S69), and the process is terminated. The user interface window 501 is accordingly closed.

In S100, if the initial index is not equal to the current index (S100: NO), in S110, the initial index is set to be a removal index. Next, in 5120, the image file corresponding to the initial index ("002") and the folder (C:\Data Folder\ID002) which has included the image file are deleted. Thus, if the enter button 505 is pressed after the image file is designated in S30, the image file displayed in S20 and the folder including the image file are deleted (see S722, S723).

Meanwhile, in S50, when the cancel button 506 is pressed (S50: YES), the process proceeds to S140, wherein it is judged as to whether the initial index is equal to the current index. If the two indexes are equal (S140: YES), it is determined that the image file has not been changed (see S12, S13, S69), and the process is terminated. The user interface window 501 is accordingly closed.

In S140, if the initial index is not equal to the current index (S140: NO), in S150, the initial index is set to be a removal index. Next, in 5120, the image file corresponding to the initial index ("002") and the folder (C:\Data Folder\ID002) which has included the image file are deleted. Thus, if the cancel button 506 is pressed after the image file is designated in S30, the image file displayed in S20 and the folder including the image file remain not to be deleted, but the folder created in S66 and the image file copied in S67 are deleted (see S722, S723.)

As described above, in the present embodiment, the folder having the unique identification corresponding to the registering index i stores the image file on one-to-one basis so that the image data for the representing image 502 and the file name 503 can be called based on the index. Further, the folder name based on the identification can be generated rather easily as seen in S14. Therefore, an image file copied and stored as above can be effectively used in a database such as so-called "registry" in the operating system Windows® for a printing operation, for example, such as a known watermark printing operation, wherein a predetermined bitmap image is superposed over an arbitrary image.

Figure 9A:
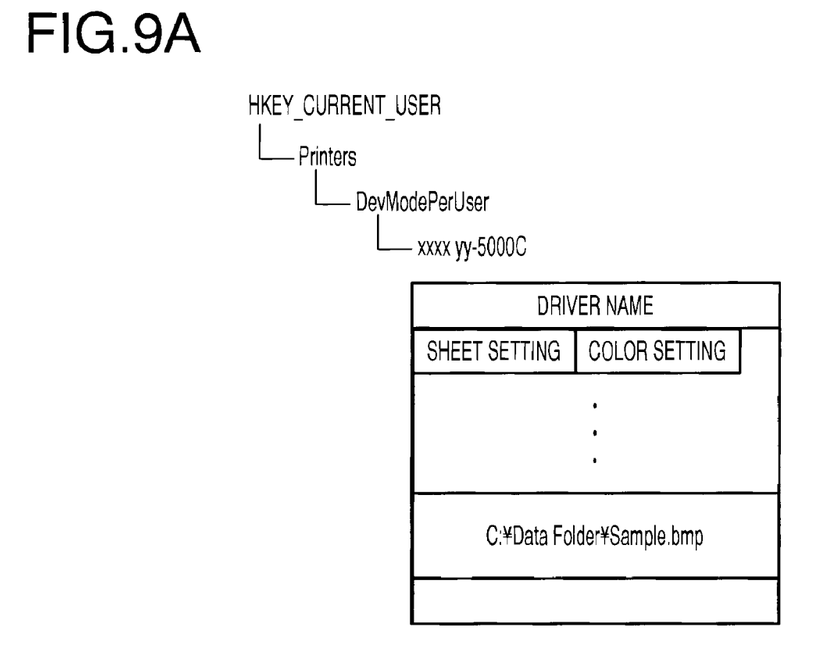
FIGS. 9A and 9B are comparative illustrations showing the registry in accordance with the embodiment of the present invention.
Figure 9B:
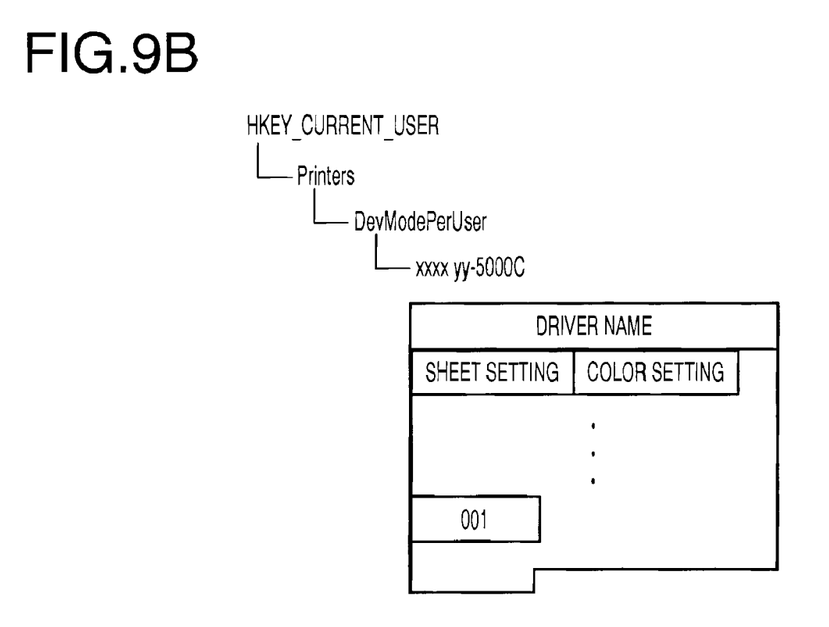

FIGS. 9A and 9B are comparative illustrations showing the registries in the HDD 314. FIG. 9A shows an example of a configuration of the registry of the printer driver which is conventionally stored. FIG. 9B shows an example of a configuration of the registry of the printer driver which is stored according to the embodiment of the present invention. As shown in FIG. 9B, the folder name can be specified by the identification "001", which is shorter than a sum (260 byte at maximum) of the file name and the path name. Further, a data volume in a database in other standard than the Windows registry can be similarly downsized according to the above described embodiment.

In the present embodiment, when an image file is registered for application use, a folder to store the image file is automatically created, and the identification is automatically assigned (in S63, S66), therefore, operability for the user can be improved. Further, the registering index i can be automatically generated by a counter operation in S62 so that the process can be simplified. Furthermore, in the present embodiment, the file name of the image file can be stored in the predetermined named folder on one-to-one basis with the file name unchanged. Therefore, the file name made by the user can be maintained during the registration so that the operability for the user can be improved even more.

Although examples of carrying out the invention have been described, those skilled in the art will appreciate that there are numerous variations and permutations of the print controlling system that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, in the present embodiment, the registering index becomes the identification of the folder, however, the identification can be configured with predetermined alphanumeric or can be random characters as long as they are uniquely generated. The identification may not be necessarily in three digits, but may be one, two, or more than three. Further, the image may be, for example, a corporate logo or a background pattern to be printed on a sheet of paper. Furthermore, the PC 300 to control the process described above may be configured with a microcomputer incorporated in the printer 1.

What is claimed is:

1. A controlling system for a printing apparatus, comprising:
   image memory;
   a processor configured to:
      store a single piece of image data, representing a single image and having a data name, in a single storage folder in the image memory, the single storage folder having a unique identification;
      generate locator information, including the unique identification to indicate a location of the storage folder in the image memory and excluding the data name, to allow the image data to be identified by the locator information regardless of the data name when a request to retrieve the single piece of image data provides the unique identification of the storage folder; and
      retrieve the single piece of image data from the storage folder with reference to the locator information.

2. The controlling system according to claim 1, wherein the processor is further configured to create the single storage folder and assign the unique identification to the single storage folder to store the single piece of image data when the single storage folder is newly created.

3. The controlling system according to claim 2, wherein the processor is further configured to generate a number which is incorporated in the unique identification of the single storage folder when the single storage folder is newly created.

4. The controlling system according to claim 1, wherein the single piece of image data is designated by the unique identification in a database of an operating system.

5. The controlling system according to claim 1, wherein the single piece of image data represents a watermark image to be printed over another image.

6. A computer implemented method comprising the steps of:
   designating an image data file, which has a file name and represents an image;
   generating locator information to indicate a location of a corresponding storage folder, in which the designated image data file is to be stored, based on a unique identification of the designated image data file;

creating the corresponding storage folder having the locator information, which indicates a location of the storage folder, as a folder name;

copying the designated image data file having the unique identification and the file name;

storing the copied image data file in the corresponding storage folder created in the creating step;

determining whether the designating of the image data file remains valid; and deleting the copied image data file and the corresponding storage folder created in the creating step when the designating of the image data file is determined to be invalid.

7. The method according to claim 6, wherein the designating of the image data file becomes invalid responsive to receipt of a cancellation instruction.

8. The method according to claim 6, wherein the designating of the image data file is invalid when the unique identification of the copied image data is identical to the unique identification of another designated image data file.

9. A non-transitory computer readable storage medium having computer readable instructions stored thereon, which when executed by a processor perform steps of:

designating an image data file, which has a file name and represents an image;

generating locator information to indicate a location of a corresponding storage folder, in which the designated image data file is to be stored, based on a unique identification of the designated image data file;

creating the corresponding storage folder having the locator information, which indicates a location of the storage folder, as a folder name;

copying the designated image data file having the unique identification and the file name;

storing the copied image data file in the corresponding storage folder created in the creating step; and determining whether the designating of the image data file remains valid; and deleting the copied image data file and the corresponding storage folder created in the creating step when the designating of the image data file is determined to be invalid.

10. A computer implemented method comprising the steps of:

designating a first image data file, which has a file name and represents an image, and retrieving a second image data file, stored on a one-to-one basis in a storage folder, created to have locator information as a folder name and excluding the file name, in image memory, from the storage folder using the locator information, the storage folder having a unique identification and the locator information indicating a location of the storage folder and being generated based on the unique identification of the storage folder and excluding the file name, and wherein the second image data file is identical to the designated first image data file.

11. A non-transitory computer readable storage medium having computer readable instructions stored thereon, which when executed by a processor perform steps of:

designating a first image data file, which has a file name and represents an image, and retrieving a second image data file, stored on a one-to-one basis in a storage folder, created to have locator information as a folder name and excluding the file name, in image memory, from the storage folder using the locator information, the storage folder having a unique identification and the locator information indicating a location of the storage folder and being generated based on the unique identification of the storage folder and excluding the file name, and wherein the second image data file is identical to the designated first image data file.

* * * * *